United States Patent [19]

Hertel

[11] 4,035,144

[45] July 12, 1977

[54] DYEING PREPARATIONS CONTAINING BORIC ACID FOR PREPARING WATER-INSOLUBLE AZO DYESTUFFS ON FIBER

[75] Inventor: Hasso Hertel, Muhlheim am Main, Germany

[73] Assignee: Hoechst Aktiengesellschaft, Frankfurt am Main, Germany

[21] Appl. No.: 594,112

[22] Filed: July 8, 1975

[30] Foreign Application Priority Data

July 11, 1974 Germany .................... 2433232

[51] Int. Cl.² .................. C07C 113/00; D06P 3/68; D06P 1/74
[52] U.S. Cl. ..................................... 8/44; 260/141; 260/142; 260/146 R; 260/182; 260/187; 260/203; 260/204; 8/46; 8/48
[58] Field of Search ............ 260/141; 8/44, 45, 46, 8/47, 48, 41 R, 41 B, 41 C

[56] References Cited

U.S. PATENT DOCUMENTS

| | | | |
|---|---|---|---|
| 1,975,409 | 10/1934 | Schnitzspahn et al. | 8/44 X |
| 3,288,552 | 11/1966 | Streck | 8/44 |
| 3,561,914 | 2/1971 | Abel et al. | 8/43 |
| 3,711,245 | 1/1973 | Neumer | 8/21 R |

*Primary Examiner*—Floyd D. Higel
*Attorney, Agent, or Firm*—Connolly and Hutz

[57] ABSTRACT

New improved dyeing preparations (formulations) have been found for preparing water-soluble azo dyestuffs on fiber according to ice-color dyeing which contain a diazonium or tetrazonium compound of an aromatic mono- or diamine having a pKa-value of more than 2.5 as well as boric acid instead of the usual aluminum sulfate or chromium (III)-acetate. These new dyeing compositions have the same good properties as comparable known dyeing preparations but avoid the severe disadvantages of the known preparations in respect to requirements in industrial medicine and ecology.

4 Claims, No Drawings

DYEING PREPARATIONS CONTAINING BORIC ACID FOR PREPARING WATER-INSOLUBLE AZO DYESTUFFS ON FIBER

The present invention relates to improved dyeing preparations for preparing water-insoluble azo dyestuffs on the fiber.

Dyeing preparations of diazonium compounds which are used in the ice color dyeing, contain in many cases buffer substances which bind the alkali metal brought into the developing bath by the naphthol impregnation, and which maintain the pH value that is optimal for the dyestuff formation. Preparations of this kind yield at once suitable developing baths when dissolved in water.

Such a buffer substance is required to show, besides a high buffer capacity in the desired pH range, a good compatibility with the diazonium salt, the solubility of which should not be reduced, or only to a slight degree. Above all, its decomposition in solution and in storage must not be accelerated.

A buffer substance that is frequently used for diazonium preparations applied to the ice color dyeing, is aluminum sulfate. However, this substance is not suitable to be used for diazonium compounds on the basis of 4-aminodiphenylamine and its methoxy derivatives (cf. Colour Index, C.I Nos. 37 240, 37 250, 37 255), which are important due to the very fast blue shades that can be obtained with them, since the optimal pH value in the coupling process is about 8 for these diazonium salts. In this case, use is made suitably of water-soluble chromium-(III) salts, in particular chromium-(III)-acetate (cf. German Patent Specification. No. 696 362 and W. Hees, Melliand Textilberichte 30 (1949), 526).

As to their dyeing properties and their stability, these products meet the requirements of the practice. However, from the point of view of industrial medicine as well as ecology, they are unsatisfactory. The skin and mucous membrane irritations of the chromium-(III)-acetate, which gives off a large amount of dust, make their handling — in particular weighing and dissolving — very annoying and hazardous to health. The entire amount of chromium-(III) used gets into the waste water and, if there are no treating units, into the rivers which, as a rule, are already strongly charged with heavy metal salts, so that a further charge can no longer be permitted.

It has now been found that dyeing preparations containing a) the diazonium or tetrazonium compound of an aromatic monoor diamine used in the ice color dyeing having a pKa value of more than 2.5 and b) boric acid, do not show these drawbacks.

The dyeing preparations of the invention have good dyeing properties as well as a good stability and they are largely unobjectionable from the ecological point of view. Another advantage is to be seen in the buffer capacity of the boric acid which is about 2.5 times greater, so that the buffer amounts used may be smaller.

The dyeing preparations of the invention contain the azonium salt (diazonium or tetrazonium salt) in an amount of from about 0.5 to 2 moles per kg and boric acid in an amount of from 150 to 900 molar per cent, preferably from 300 to 750 molar per cent, calculated on the azonium salt used.

The standardizing agent possibly required in order to adjust a determined content of pure dyestuff must not, or only to a slight degree, reduce the solubility and the stability of the azonium salt.

Moreover, the novel dyeing preparations may contain a common dust removing agent, for example, non-volatile liquid mineral oils, such as those known from German Patent Specification No. 274 642.

As diazonium and/or tetrazonium compounds, there may be used, for example, compounds on the basis of chloroanilines, anisidines, chlorotoluidines, chloroanisidines, anilinesulfonic acid-dialkylamides, toluidine-sulfonic acid-dialkyl-amides with lower alkyl groups, anisidine-sulfonic acid-alkyl-amides with lower alkyl radicals and -dialkylamides with lower alkyl radicals, anisidine-carboxylic acid-amides, acylamino-anilines with an acylamino radical of an aliphatic or aromatic carboxylic acid, in particular benzoylamino-anilines optionally being substituted by halogen atoms, for example chlorine, lower alkyl and/or lower alkoxy groups, amino-azobenzenes optionally substituted by halogen atoms, such as chlorine, lower alkyl, lower alkoxy and/or nitro groups, and also by amino-phenylamino radicals, as well as compounds on the basis of o-toluidine and o-dianisidine. Such amines having a pKa value of more than 2.5 are described, for example, in the Swiss Pat. Specification No. 336 082. They may be present as chlorides, hydrogeno-sulfates, tetrachlorozincates, tetrafluoroborates, or arylsulfonates. There are to be mentioned, in particular, 3-chloro-benzene-diazonium-tetrafluoroborate, 4-chloro- and 5-chloro-2-methyl-benzene-diazonium-naphthalene-1,5-disulfonate, 2-methoxy-5-diethyl-sulfamoyl-benzene-diazonium-tetrachlorozincate, 4,4'-dichloro-diphenyl-oxide-2-diazonium chloride, 2-methoxy-5-carbamoyl-benzene-diazonium-tetrachlorozincate, 5-chloro-4-benzoylamino-2-methyl-benzene-diazonium-tetrachlorozincate, 4-benzoylamino-2-methoxy-5-methyl-benzene-diazonium-tetrachlorozincate, 5-benzoylamino-2,4-dimethoxy-benzene-diazonium-chloride, 4-benzoylamino-2,5-dimethoxy-benzene-diazonium-tetrachlorozincate, 2',3-dimethyl-azobenzene-4-diazonium-hydrogenosulfate, 4'-phenylamino-5-ethoxy-2-methyl-azobenzene-4'',4-bis-diazonium-tetrachlorozincate, 3,3'-dimethoxy-diphenyl-4,4'-bis-diazonium-tetrachlorozincate, and diphenyl-bis-4,4'-diazonium-tetrachlorozincate.

As diazonium compounds contained in the dyeing preparations of the invention, also those of the 4-aminodiphenylamine and its substitution products are important.

As diazonium compounds of the 4-amino-diphenylamine, there may be mentioned, in particular, the diazonium chlorides, bromides or sulfates. As substitution products there are mentioned 4-amino-diphenylamines substituted by halogen atoms, such as fluorine, chlorine, or bromine atoms, alkyl groups having from 1 to 5 carbon atoms, such as methyl or ethyl groups, alkoxy groups having from 1 to 5 carbon atoms, such as methoxy, ethoxy or propoxy groups, particularly the 4-amino-3'-methoxydiphenylamine as well as the 4-amino-4'-methoxydiphenylamine.

In this connection, reference should be made particularly to those dyeing preparations which contain a diazonium salt of the general formula

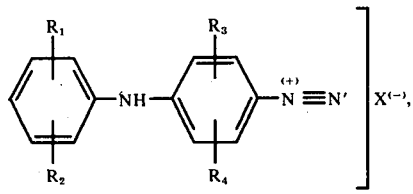

wherein R₁, R₂, R₃ and R₄ are identical or different, each representing a hydrogen or chlorine atom or an alkyl group having from 1 to 4 to carbon atoms or an alkoxy group having from 1 to 4 carbon atoms, and $X^{(-)}$ stands for the chloride, bromide or sulfate/₂-anion.

However, $X^{(-)}$ may also be one of the other anions mentioned before.

Such dyeing preparations of the invention may have, for example, the following formulations which are interesting from the technical point of view:

28% of 4'-methoxy-diphenylamine-4-diazoniumchloride,
40% of boric acid,
28% of dextrine,
residual portion: inorganic accompanying substances;
or
28% 4'-methoxy-diphenylamine-4-diazoniumchloride,
25% of boric acid,
43% of dextrine,
residual portion: inorganic accompanying substances;
or
14% of 3-methoxy-diphenylamine-4-diazoniumchloride,
20% of boric acid,
64% of dextrine,
residual portion: inorganic accompanying substances;
or
25% of diphenylamine-4-diazoniumchloride,
40% of boric acid,
31% of dextrine,
residual portion: inorganic accompanying substances;
or
25% of diphenylamine-4-diazoniumchloride,
40% of boric acid,
31% of sodium sulfate,
residual portion: inorganic accompanying substances. The percentages are per cent by weight.

Furthermore, there are to be mentioned dyeing preparations and di- and/or tetrazonium compounds of such amines which correspond to the general formulae (1), (2) or (3)

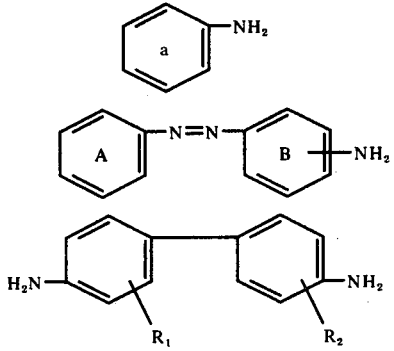

in which the benzene nucleus a may be substituted by one or more, as for example 1, 2 or 3, preferably 1 or 2, substituents selected from a group consisting of chlorine, alkyl having from 1 to 5 carbon atoms, alkoxy having from 1 to 5 carbon atoms, sulfonamide, monoalkyl-sulfonamide with alkyl having from 1 to 5 carbon atoms, dialkylsulfonamide with alkyl having from 1 to 5 carbon atoms each, carbonamide, monoalkyl-carbonamide with alkyl having from 1 to 5 carbon atoms, dialkylcarbonamide with alkyl having from 1 to 5 carbon atoms each and the radical of the formula —NH—CO—R, wherein R stands for phenyl which may be substituted by 1 or 2 or 3 groups selected from chlorine, alkyl having from 1 to 4 carbon atoms and alkoxy having from 1 to 4 carbon atoms, or stands for an alkyl group having from 1 to 4 carbon atoms, the benzene nuclei A and B may be substituted each by 1 or 2 identical or different substituents selected from a group consisting of chlorine, alkyl having from 1 to 5 carbon atoms and alkoxy having from 1 to 5 carbon atoms, and A may additionally be substituted by the aminophenylamino radical, R₁ and R₂ being identical or different, each representing hydrogen, alkyl having from 1 to 5 carbon atoms or alkoxy having from 1 to 5 carbon atoms; as anions, they contain preferably the chloride, bromide, hydrogenosulfate, tetrachlorozincate, or tetrafluoroborate anion.

The preparation of the diazonium and/or tetrazonium salts is carried out according to known methods. The subject has been described, for example, in K. Holzach, "Die Diazoverbindungen", Stuttgart 1947 or in Ullmanns Encyklopadie der technischen Chemie, 3rd edition, volume 5, pages 786 ff. (further literature may also be found there), as well as in W. Seidenfaden, "Kuenstliche Farbstoffe und ihre Anwendungen", published by F. Enke, Stuttgart 1957, page 223.

The dry diazonium and/or tetrazonium salts obtained are — optionally after a grinding process — mixed with boric acid and the auxiliary adjusting and standardizing agents in a suitable mixing device.

As standardizing agents there may be used, for example, sodium sulfate, potassium sulfate, magnesium sulfate, the sodium salt of benzene-disulfonic acid, the sodium salt of naphthalene-trisulfonic acid, or dextrine.

The novel dyeing preparations according to the invention on the basis of azonium salts are excellently suitable to be used in the ice color dyeing. The coupling components to be used for the new azonium salt formulations for the preparation of the water-insoluble azo dyestuffs on the fiber, according to common methods and in accordance with the ice color technique, are the aromatic hydroxy-azo components known and used in the ice color dyeing. Compounds of this kind have been described, for example, in the "Colour Index" under the C.I. Nos. 37 505 to 37 608. Of these, reference should be made in particular to the 2-hydroxynaphthalene-3-carboxylic acid-arylamides.

The dyeings prepared with the novel dyeing preparations and the corresponding coupling components of the ice color technique are distinguished by even, equal and pure color shades, as well as by good fastness properties, in particular the fastness to washing and to light.

The following Examples serve to illustrate the invention. The parts are parts by weight, the percentages are per cent by weight. Parts by weight are to parts by volume as is the kilogram to the liter.

EXAMPLE 1

300 Parts of a 4'-methoxy-diphenylamine-4-diazoniumchloride having a content of pure dyestuff of 76.4% by weight, calculated on a molecular weight of 214, were ground together with 207 parts of boric acid in a disk attrition mill and were mixed in a double screw mixer. After the addition of 403 parts of ground dextrine, the mixture was continued to be mixed, until the homogeneity was reached. Subsequently the mixer was emptied.

A gray-brown pulverulent dyeing preparation was obtained which was well soluble in water.

In order to produce blue dyeings on cotton, cotton fabric was padded with a solution of 10 parts of 2-hydroxy-naphthalene-3-carboxylic acid-phenylamide (Colour Index No. 37505), 10 parts of an aqueous sodium hydroxide solution of 32% strength and 5 parts of a commercial dyeing and level-dyeing auxiliary agent on the basis of a fatty acid-protein degradation product condensate in 1000 parts of water, with a padding liquor pick-up of 80% by weight, calculated on the fabric. The goods which had been dried afterwards were then padded over in a second padder with a dye bath having room temperature (the liquor pick-up also being 800 g per kg of fabric), the bath having been prepared by dissolving 35 parts of the dyeing preparation described above in a solution of 5 parts of a polyethylene-glycol ether in 1000 parts of water. After an air passage of about 1 minute, a hot water passage followed. Subsequently the goods were washed, soaped and dried as usual.

The dyeings obtained were absolutely equal to those produced with dyeing preparations known so far, as far as the regularity of the color shade and the good fastness properties were concerned.

If 2-hydroxy-naphthalene-3-carboxylic acid-(2'-methoxyphenyl)-amide was used instead of 2-hydroxy-naphthalene-3-carboxylic acid-phenylamide, a blue dyeing was obtained which was also very fast to light and was slightly more reddish.

EXAMPLE 2 a. If the various processes were carried out as mentioned above in Example 1, however, 300 parts of diphenylamine-4-diazonium-chloride with a content of pure dyestuff of 70%, calculated on a molecular weight of 184, 400 parts of boric acid and 300 parts of dextrine were used, a gray-brown pulverulent powder was obtained, which was well soluble in water and which could be used in the ice color dyeing, so as has been described in Example 1, in order to produce blue dyeings on cotton fabric. The blue dyeings obtained in this way were somewhat more reddish than those obtained with the preparation according to Example 1.

b. In order to produce a deep-bluish-violet dyeing having a good fastness to light on cotton fabric, 14 parts of 2-hydroxy-naphthalene-3-carboxylic acid-(5'-chloro-2',4'-dimethoxy-phenyl-1')-amide were strewn into a bath having a temperature of 90° C and being composed of 1000 parts of soft water, 14 parts by volume of an aqueous sodium hydroxide solution of 32% strength and 10 parts of a commercial dyeing and level-dyeing auxiliary agent on the basis of a protein-fatty acid degradation product condensate, and were dissolved by boiling. Subsequently cotton fabric was padded on a padder with this solution, while it was still hot with a liquor pick-up of 800 g per kg of fabric. After drying, the fabric was padded over in a second padder with a dye bath of room temperature which had been prepared by dissolving 36 parts of the dyeing preparation described under a) in a solution of 5 parts of a polyethylene-glycol ether in 1000 parts of water. After an air passage of about 1 minute, a hot water passage followed. Subsequently the dyed goods were soaped, washed and dried as usual.

c). If 11 parts of 2-hydroxynaphthalene-3-carboxylic acid-(2'-methyl-phenyl-1')-amide were used instead of the 2-hydroxy-naphthalene-3-carboxylic acid-(5'-chloro-2',4'-dimethoxy-phenyl-1')-amide, a deep navy blue dyeing was obtained which had a very good fastness to light.

EXAMPLE 3

300 parts by weight of 3-methoxy-diphenylamine-4-diazoniumchloride (content of pure dyestuff = 66.0% by weight, calculated on a molecular weight of 214) were ground — as has been described in Example 1 — with 325 parts by weight of boric acid, and were then mixed with 1000 parts by weight of ground dextrine.

The preparation obtained could be used, in the manner as has been described above, in order to produce blue dyeings on cotton fabric.

EXAMPLE 4

500 Parts of 4'-methoxy-diphenylamine-4-diazoniumchloride (content of pure dyestuff = 76.4% by weight, calculated on a molecular weight of 214) were ground together with 345 parts of boric acid in a disk attrition mill and were then introduced into a double screw mixer in which they were thoroughly mixed. With this dyeing preparation, the ice color dyeing process when carried out in accordance with Example 1, yielded blue cotton dyeings of a high quality.

If cotton dyeings were produced with this preparation, while using the coupling component 2-hydroxynaphthalene-3-carboxylic acid-phenylamide, in the manner as has been described in Example 1, only 19.4 parts of the above dyeing preparation were required per 1000 parts of water, instead of the 35 parts of dyeing preparation mentioned therein, due to the fact that the former preparation had a content of diazonium salt which was 1.8 times higher than that of the latter.

EXAMPLE 5

A dyeing preparation having properties similar to those of the preparation described in Example 2 was obtained, if half the dextrine was replaced by anhydrous sodium sulfate.

EXAMPLE 6

1900 Parts of 4'-methoxy-diphenylamine-4-diazoniumchloride (content of pure dyestuff = 76.4% by weight, calculated on a molecular weighr of 214) were ground together with 2400 parts of boric acid and 30 parts of magnesium oxide in a sieveless disk attrition mill and were introduced into a double screw mixer running at low speed. 1700 Parts of ground dextrine were added and were well mixed with the rest. 20 Parts of a liquid non-volatile aliphatic hydrocarbon were introduced by spraying and were mixed with the other components. Subsequently the mixer was emptied.

In order to produce a blue dyeing, a bleached cotton fabric was impregnated by means of a padder with a liquor pick-up of 800 g/kg using a solution that had been prepared as usual and was composed of 4 parts by weight of 2-hydroxynaphthalene-3-carboxylic acid-(2'-methoxy-phenyl-1')-amide, 8 parts by volume of sodium hydroxide solution of 32% strength and a protective colloid in 1000 parts by volume of water, then the fabric was submitted to an intermediate drying and was padded over with a dye bath having room temperature with a liquor pick-up of 800 g/kg, which dye bath had been obtained by dissolving 14 parts by weight of the above-mentioned preparation in 1000 parts by volume of water. After an air passage of about 1 minute, a hot water passage followed. Subsequently the goods were soaped, washed and dried as usual.

EXAMPLE 7

300 Parts of 5-benzoylamino-2,4-dimethoxybenzene-diazoniumchloride having a content of pure dyestuff of 70% by weight, calculated on a molecular weight of 272, were ground together with 340 parts of boric acid in a disk attrition mill and were introduced into a double screw mixer. After 500 parts of ground anhydrous sodium sulfate had been added, the components were mixed until homogeneity was reached. Subsequently the mixer was emptied.

A light brown pulverulent dyeing preparation was obtained which was well soluble in water.

In order to produce violet dyeings on cotton, a cotton fabric was padded with a solution of 12.5 parts of 2-hydroxynaphthalene-3-carboxylic acid-phenylamide (Colour Index No. 37 505), 17 parts of an aqueous sodium hydroxide solution of 32% strength and 5 parts of a commercial dyeing and leveldyeing auxiliary agent on the basis of a fatty acid-protein degradation product condensate in 1000 parts of water with a liquor pick-up of 80% by weight, calculated on the fabric. The goods which had been dried afterwards were then padded over in a second padder with a dye bath having room temperature and with a liquor pick-up of 800 g per kg of fabric, which dye bath had been prepared by dissolving 81 parts of the above-specified dyeing preparation in a solution of 4 parts of a polyethylene-glycol ether in 1000 parts of water. After an air passage of about 1 minute, a hot water passage followed. Subsequently the goods were washed, soaped and dried as usual.

The dyeings obtained were absolutely equal, as far as the regularity of the color shade and the good fastness properties were concerned, to the dyeings that can be obtained with dyeing preparations known so far.

If 2-hydroxy-naphthalene-3-carboxylic acid-(2'-methylphenyl)-amide was used instead of 2-hydroxy-naphthalene-3-carboxylic acid-phenylamide, the violet dyeing obtained was also fast to light and was slightly more reddish.

EXAMPLE 8

500 Parts of 4-chloro-2-methyl-benzene-diazonium-naphthalene-1,5-disulfonate were ground and introduced into a double screw mixer and were mixed there with 210 parts of ground boric acid and 340 parts of ground naphthalene-trisulfonic acid sodium.

In order to produce a red dyeing on cotton fabric, 50 parts of wetted-out cotton yarn were at first treated for 30 minutes in a bath having temperature of about 30° C, which bath had been prepared by stirring 5 parts of 2-hydroxynaphthalene-3-carboxylic acid (4'-methoxy-2'-methyl-phenyl-1')-amide in 6 parts of ethanol, dissolving the components by adding 3 parts of sodium hydroxide solution of 33% strength, 7.5 parts of water of 40° C and 5 parts of formaldehyde of 33% strength, and by pouring the solution into a mixture of 1000 parts of water, 13 parts of sodium hydroxide solution of 33% strength and 5 parts of a fatty acid-protein hydrolysate condensation product. The cotton yarn was removed from the bath and, after elimination of the excess bath liquor by centrifuging, was placed into a developing bath which consisted of 6.2 parts of the above-mentioned dyeing preparation, 3 parts of a common dyeing auxiliary agent and 1000 parts of water. The goods were moved in this bath for 30 minutes, then they were rinsed, soaped in a hot and boiling state, clear-rinsed and dried as usual.

EXAMPLE 9

500 Parts of 4-benzoylamino-2,5-dimethoxybenzene-diazoniumtetra-chlorozincate having a content of pure dyestuff of 72% by weight, calculated on a molecular weight of 300, were ground and introduced into a mixer, and were there mixed with 300 parts of boric acid and 200 parts of dextrine.

In order to produce a blue dyeing on cotton yarn, a wetted-out cross-wound package with 500 parts of cotton yarn in a dyeing apparatus was as first treated with 5000 parts of a dye liquor containing 12.5 parts of 2-hydroxynaphthalene-3-carboxylic acid-(4'-chloro-phenyl-1')-amide, 68 parts of sodium hydroxide solution of 32% strength, 6 parts of formaldehyde of 33% strength and 15 parts of a common protective colloid. After 30 minutes this dye liquor was pumped off, and the goods were subjected to an intermediate rinsing for 8 minutes with a solution of 150 parts of sodium chloride and 5 parts of sodium hydroxide solution of 33% strength in 5000 parts by volume of water. After this bath had been pumped off, the goods were treated for 30 minutes with a dye bath consisting of 32 parts of the above-mentioned dyeing preparation and 8 parts of a common auxiliary in 5000 parts of water, and were subsequently rinsed, soaped in a hot and boiling state, clear-rinsed and dried as usual.

EXAMPLE 10

The dyeing process was carried out as has been described in Example 9, however, 300 parts of 4-benzoylamino-2-methoxy-5-methyl-benzene-diazonium-tetrachlorozincate, which had a content of pure dyestuff of 70%, calculated on a molecular weight of 256, 200 parts of boric acid and 500 parts of sodium sulfate were used.

In order to produce a violet dyeing on cotton yarn, the process was continued as has been described in Example 9, however, in the second dye bath, 48 parts of the dyeing preparation manufactured as mentioned above were used.

EXAMPLE 11

By mixing 2',3-dimethyl-azobenzene-4-diazonium-hydrogenosulfate with boric acid, a dyeing preparation was prepared which contained in 1000 parts 400 parts of diazonium salt, calculated on a molecular weight of 225.

In order to produce a claret shade, the dyeing process was carried out as has been described in Example 8, however, in the developing bath, 2.2 parts of the dyeing preparation described above were used.

EXAMPLE 12

A dyeing preparation was prepared from 4'-phenylamino-5-ethoxy-2-methyl-azobenzene-4",4'-bis-diazonium-tetrachlorozincate, boric acid, magnesium oxide and dextrine, according to the method described in the previous Examples, which preparation contained 20.5% of diazonium salt, calculated on a molecular weight of 361, 0.25% of magnesium oxide and 15% or boric acid.

In order to produce a black dyeing on cotton fabric, the dyeing process was carried out as has been described in Example 1, in which process 17.5 parts of 2-hydroxy-naphthalene-3-carboxylic acid-phenylamide and 23.5 parts of sodium hydroxide solution of 33% strength were used in the bottoming bath, and the developing bath contained 68 parts of the above-mentioned dyeing preparation.

I claim:

1. In a dyeing preparation comprising a diazonium or tetrazonium compound of an aromatic mono- or diamine suitable in ice-color dyeing and having a pKa-value of more than 2.5, and a buffer substance, the improvement wherein boric acid is the buffer substance in an amount of from 150 to 900 molar precent calculated on the azonium salt.

2. A dyeing preparation as claimed in claim 1, wherein the di- or tetrazonium compound is a compound of an amine of the formula

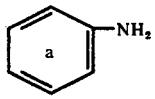
(1)

or

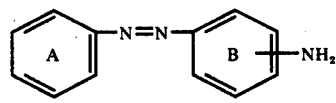
(2)

or

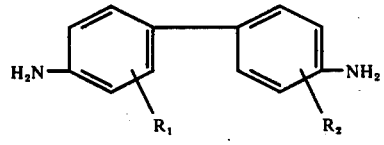
(3), in which the benzene nucleus a is unsubstituted or substituted by one or more substitutents selected from the group consisting of chlorine, alkyl of 1 to 5 carbon atoms, alkoxy of 1 to 5 carbon atoms, sulfonamide, monoalkyl-sulfonamide with alkyl of 1 to 5 carbon atoms, dialkyl-sulfonamide with alkyl of .1 to 5 carbon atoms each, carbonamide, monoalkyl-carbonamide with alkyl of 1 to 5 carbon atoms, dialkyl-carbonamide with alkyl of 1 to 5 carbon atoms each and the radical of the formula —NH—CO—R, wherein R is alkyl of 1 to 4 carbon atoms or is phenyl or phenyl substituted by chlorine, alkyl of from 1 to 4 carbon atoms and alkoxy of from 1 to 4 carbon atoms, the benzene nucleus A is unsubstituted or substituted by 1 or 2 identical or different substituents selected from the group consisting of chlorine, alkyl of 1 to 5 carbon atoms, alkoxy of 1 to 5 carbon atoms and aminophenylamino, the benzene nucleus B is unsubstituted or substituted by 1 or 2 identical or different substituents selected from the group consisting of chlorine, alkyl of 1 to 5 carbon atoms and alkoxy of 1 to 5 carbon atoms and $R_1$ and $R_2$ are identical or different and each is hydrogen, alkyl of 1 to 5 carbon atoms or alkoxy of 1 to 5 carbon atoms.

3. A dyeing preparation as claimed in claim 1, wherein the diazonium salt is a compound of the formula

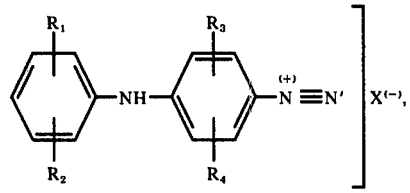

wherein $R_1$, $R_2$, $R_3$ and $R_4$ are identical or different and each is hydrogen, chlorine, alkyl of from 1 to 4 carbon atoms or alkoxy of from 1 to 4 carbon atoms, and $X^{(-)}$ is an anion.

4. A dyeing preparation as claimed in claim 1, wherein the diazonium salt is the diazonium chloride of 4-aminodiphenylamine, of 4-amino-3-methoxydiphenylamine or of 4-amino-4'-methoxydiphenylamine.

* * * * *